3,787,391
ADENOSINE COMPOUNDS AND THERAPEUTIC
COMPOSITIONS
Werner Jahn, Heidelberg, Wolfgang Kampe, Heddesheim,
Erich Fauland, Mannheim-Waldhof, Wolfgang Juhran,
Mannheim, and Harald Stork, Mannheim-Feudenheim,
Germany, assignors to Bohringer Mannheim GmbH,
Mannheim, Germany
No Drawing. Filed Nov. 22, 1971, Ser. No. 201,174
Claims priority, application Germany, Dec. 8, 1970,
P 20 60 189.2
Int. Cl. C07d 51/54
U.S. Cl. 260—211.5 R
13 Claims

ABSTRACT OF THE DISCLOSURE

New adenosine compounds of the formula:

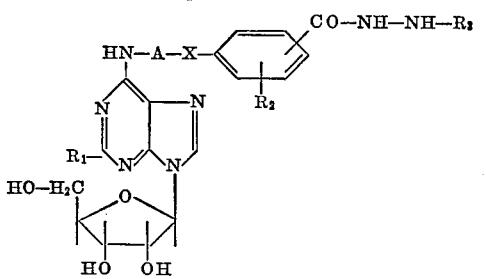

wherein $R_1$ is hydrogen or halogen; $R_2$ is hydrogen, halogen, hydroxyl, alkyl or alkoxy; $R_3$ is hydrogen or —CO—$R_4$, wherein $R_4$ is aryl which is optionally substituted one or more times by halogen and/or alkyl, alkoxy and/or hydroxyalkyleneoxy; A is a straight-chained or branched alkylene radical containing up to 3 carbon atoms and X is a valency bond or oxygen; and the physiologically compatible salts thereof, exhibit remarkable effectiveness in improving the blood circulation of mammals and also bring about a depression of serum lipids.

---

The present invention is concerned with new adenosine derivatives and with pharmaceutical compositions containing these new compounds, and with the uses thereof.

The new adenosine derivatives according to the present invention are compounds of the general formula:

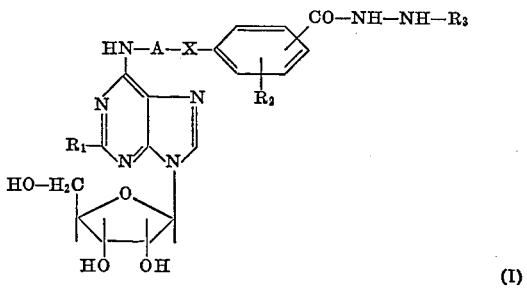

wherein $R_1$ is hydrogen or halogen; $R_2$ is hydrogen, halogen, hydroxyl, alkyl or alkoxy; $R_3$ is hydrogen or —CO—$R_4$, wherein $R_4$ is aryl which is optionally substituted one or more times by halogen and/or alkyl, alkoxy and/or hydroxyalkyleneoxy; A is a straight-chained or branched alkylene radical containing up to 3 carbon atoms and X is a valency bond or oxygen; and the physiologically compatible salts thereof.

We have found that the new compounds of general Formula I have a surprisingly good circulatory action and bring about a sinking of the serum lipids.

The new compounds of general Formula I can be prepared, for example, by one of the following methods:

(a) Reaction of a purine riboside of the general Formula:

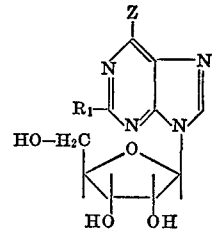

wherein $R_1$ has the same meaning as above and Z is a halogen atom or a reactive mercapto group, with an amine of the general formula:

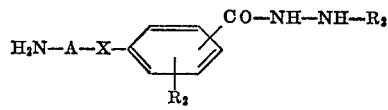

wherein A, X, $R_2$ and $R_3$ have the same meaning as above, optionally with intermediate blocking of the hydroxyl groups of the sugar residue; or (b) Heating an $N^1$-substituted adenosine derivative of the general formula:

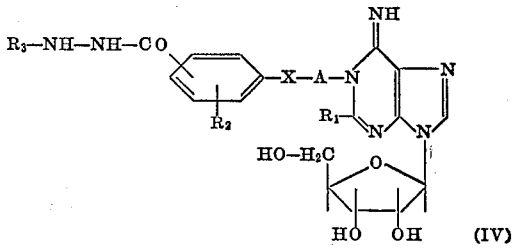

in which A, X, $R_1$, $R_2$ and $R_3$ have the same meanings as above, or a derivative thereof in which the hydroxyl groups of the sugar residue are blocked, in alkaline solution, followed, if necessary by acidic saponification of the protective groups; or (c) Reaction of a compound of the general formula:

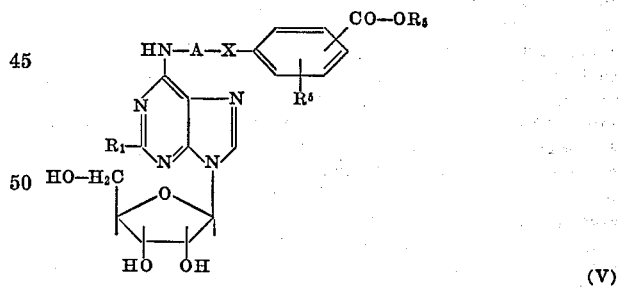

wherein A, X, $R_1$, and $R_2$ have the same meanings as above and $R_5$ is an alkyl radical, or a derivative thereof in which the hydroxyl groups of the sugar residue are blocked, with a compound of the general formula:

wherein $R_3$ has the same meaning as above, whereupon, if desired, the Compound I thus obtained is converted into a physiologically compatible salt thereof.

The alkyl and alkoxy radicals in the Compounds I are preferably the lower alkyl and alkoxy, e.g., of up to 6 carbons.

Reactive mercapto groups in the starting materials (II) are preferably methylmercapto or benzylmercapto radicals.

As intermediate protective or blocking groups for the hydroxyl groups of the sugar residues, the acyl derivatives and the cyclic acetals and ketals are preferred. The acyl radicals are preferably removed by alkaline saponification, whereas the cyclic acetals and ketals can be split by acidic hydrolysis, preferably with formic acid or with a dilute mineral acid.

The Compounds IV used as starting materials can be prepared by the reaction of adenosine or of its acyl derivatives or acetals or ketals with conventional N-alkylation agents. There are preferably used compounds of the general formula:

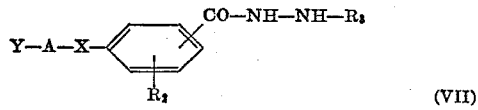

(VII)

wherein A, X, $R_2$ and $R_3$ have the same meanings as above and Y is a reactive residue, for example a halogen atom or an aliphatic or aromatic sulfonyl radical or the like.

According to a preferred variant of this process, the Compound IV is not isolated; the solution is rendered weakly alkaline and then heated for a short period of time. In this way, the Compounds I or the corresponding acyl derivatives or the acetals or ketals are obtained directly and can subsequently split into the free adenosine derivatives by the action of bases or acids.

When reacting the purine riboside derivatives (II) with the benzylamines (III), the reactants are preferably heated together in a solvent and then worked up in the usual manner.

The reaction of the Compounds V with the hydrazine derivatives VI is also expediently carried out at an elevated temperature.

The pharmacologically compatible salts are obtained in the usual way, for example, by neutralization of the Compounds I with non-toxic inorganic or organic acids, for example, with hydrochloric acid, sulfuric acid, phosphoric acid, hydrobromic acid, acetic acid, lactic acid, citric acid, malic acid, salicyclic acid, malonic acid, maleic acid or succinic acid.

The Compounds I according to the present invention and the salts thereof can be administered enterally and parenterally in admixture with liquid or solid pharmaceutical diluents or carriers. In this case, the conventional forms of administration can be used, for example, tablets, capsules, dragees, syrups, solutions, suspensions and the like. As injection medium, water is preferably used which contains the usual additives for solutions, such as stabilizing agents, solubilizing agents and buffers. Additives of this type are, for example, tartrate and citrate buffers, ethanol, complex-forming agents (such as ethylenediamine-tetraacetic acid and the non-toxic salts thereof) and high molecular weight polymers (such as liquid polyethylene oxide) for viscosity regulation. Liquid carrier materials for injection solutions must, of course, be sterile, and are preferably placed in ampoules. Solid carrier materials are, for example, starch, lactose, mannitol, methyl-cellulose, talc, highly dispersed silicic acids, high molecular weight fatty acids (such as stearic acid), gelatine, agar-agar, calcium phosphate, magnesium stearate, animal and vegetable fats and solid high molecular weight polymers (such as polyethylene glycols); compositions suitable for oral administration can, if desired, also contain flavoring and sweetening agents.

The following examples are given for the purpose of illustrating the present invention:

EXAMPLE 1

Preparation of 1-[4-(nebularinyl-(6)-aminomethyl)-benzoyl]-2-(4-chlorobenzoyl)-hydrazine 5.0 g. triacetyl-adenosine and 4.7 g. N - (4 - chlorobenzoyl)-N'-(4-bromomethyl-benzoyl) - hydrazine were dissolved in 10 ml. dimethylformamide and heated to 90° C. for 18 hours. The reaction mixture was then distilled in a vacuum and the residue was taken up in about 20 ml. ethanol and mixed with 40 ml. concentrated aqueous ammonia solution. The reaction mixture was heated under reflux for 1 hour, while stirring, again distilled off and the residue taken up in 20 ml. ethanol. There crystallized out 3.0 g. (40% of theory) 1-[4-nebularinyl-(6)-aminomethyl)-benzoyl]-2-(4-chlorobenzoyl) - hydrazine, which had a melting point of 240–244° C. The compound can be recrystallized from 50% methanol.

The following compounds were obtained in an analogous manner from triacetyl-adenosine and the indicated starting material:

(a) 1-[4-nebularinyl-(6)-aminomethyl)-benzoyl] - 2 - (4-methoxy-benzoyl)-hydrazine; M.P. 251–252° C.; yield 38% of theory; from N-(4-methoxy-benzoyl)-N'-(4-bromomethyl-benzoyl)-hydrazine;

(b) 1-[4-nebularinyl-(6)-aminomethyl)-benzoyl] - 2-(4-hydroxyethoxy-benzoyl)-hydrazine; M.P. 240–242° C.; yield 35% of theory; from N-(4-hydroxyethoxy-benzoyl)-N'-(4-bromomethyl-benzoyl)-hydrazine;

(c) 1-[4-(nebularinyl-(6)-aminomethyl)-3 - chlorobenzoyl]-2-(4-hydroxyethoxy - benzoyl) - hydrazine; M.P. 156–160° C.; yield 36% of theory; from N-(4-hydroxyethoxy-benzoyl)-N'-(4-bromomethyl-3-chlorobenzoyl)-hydrazine;

(d) 1-[4-(nebularinyl-(6)-aminomethyl) - benzoyl] - 2-(2-methylbenzoyl)-hydrazine; M.P. 165–170° C.; yield 42% of theory; from N-(2-methyl-benzoyl)-N'-(4-bromomethyl-benzoyl)-hydrazine.

The N-(4-chlorobenzoyl)-N'-(4 - bromomethyl - benzoyl)-hydrazine used in Example 1 as starting material was obtained in the following manner.

5.0 g. 4-chlorobenzoic acid hydrazide were dissolved, with gentle heating, in about 50 ml. dioxan and 20 ml. water and mixed with a solution of 8.2 g. 4-bromomethyl-benzoyl bromide in about 20 ml. dioxan. Subsequently, 29.5 ml. 1 N sodium hydroxide solution were added thereto and the mixture was evaporated in a vacuum to about half its volume and mixed with about 100 ml. water. The product which separates out was, after brief storage in a refrigerator, filtered off with suction and dried over phosphoric pentoxide (yield 80–85% of theory). The compound can be used without further purification.

The hydrazine derivatives used as starting materials in Examples 1(a) to 1(d) can be prepared in an analogous manner.

EXAMPLE 2

Preparation of N(6)-(5-hydrazinocarbonyl-2-methyl-benzyl)-adenosine 1.5 g. N(6)-(5)-ethoxycarbonyl-2 - methyl - benzyl)-adenosine were heated under reflux for 1 hour in a mixture of 10 ml. water and 10 ml. hydrazine hydrate. The precipitate which formed upon cooling was filtered off with suction and thoroughly washed with water and methanol. After drying, there was obtained 1.1 g. (76% of theory) N(6)-(5-hydrazinocarbonyl-2 - methyl - benzyl)-adenosine, which had a melting point of 168–170° C.

The following compounds were prepared in an analogous manner from hydrazine hydrate and the indicated starting materials:

(a) N(6)-(2 - hydrazinocarbonyl - benzyl) - adenosine; M.P. 145–146° C.; yield 82.5% of theory; from N(6)-(2-ethoxycarbonyl-benzyl)-adenosine;

(b) N(6)-(4 - hydrazinocarbonyl - benzyl) - adenosine; M.P. 224–226° C.; yield 78% of theory; from N(6)-(4-methoxycarbonyl-benzyl)-adenosine;

(c) N(6)-(3 - hydrazinocarbonyl - 2 - methyl - benzyl)-adenosine: M.P. 237–238° C.; yield 79% of theory; from N(6)-(3-ethoxycarbonyl - 2 - methyl - benzyl)-adenosine;

(d) N(6)-(3-hydrazinocarbonyl) - adenosine; M.P. 186–189° C.; yield 60% of theory; from N(6)-(3-methoxy-carbonyl-benzyl)-adenosine;

(e) N(6)-(4-hydrazinocarbonyl-phenethyl) - adenosine; M.P. 255–256° C.; yield 68% of theory; from N(6)-(4-methoxycarbonyl-phenethyl)-adenosine;

(f) N(6)-(4-hydrazinocarbonyl - 2 - methyl - benzyl)-adenosine; M.P. 236–237° C.; yield 83% of theory; from N(6)-(4-ethoxycarbonyl-2-methyl-benzyl)-adenosine;

(g) N(6)-[2-(4-hydrazinocarbonyl - phenoxy) - ethyl]-adenosine; M.P. 221–222° C.; yield 61% of theory; from N(6)-[2-(4 - ethoxycarbonyl - phenoxy)ethyl]-adenosine;

(h) N(6)-(4-hydrazinocarbonyl-phenethyl) - 2 - chloro-adenosine; M.P. 220–221° C.; yield 70% of theory; from N(6)-(4-ethoxycarbonyl-phenethyl) - 2 - chloro-adenosine.

Adenosine on intravenous administration to mammals and humans produces a vasodilation. In particular, this effect is noticeable in the coronary vascular ssytem whereas in a marked increase in blood circulation results from the vasodilation produced by the administration of the adenosine (Berne, Blackmon and Gardner, J. clin. Invest. 36, 1101 (1957)). Due to the rapid deamination of the adenosine, however, this effect is extremely transient. N(6)-substituted derivatives of adenosine also exert a marked coronary vasodilating effect of high specificity, but in contrast to adenosine, the effect is a prolonged one.

In order to compare the effectiveness of the novel N(6)-substituted adenosine compounds of this invention on coronary blood circulation to a known compound, N(6)-benzyl adenosine, which has already been described in the literature (J. A. Montgomery et al., J. org. Chem. 28, 2304 (1963)), was selected as a comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen, i.e., to an improvement in the oxygen supply to the myocardium which is the ultimate aim sought to be achieved with all coronary dilating agents.

For the purpose of obtaining an exact basis for evaluating the results of the tests, the decrease in coronary arteriovenous oxygen difference (at the time of the maximum effect) is reported in volume percent as compared to the starting value. The greater the value reported the more significant was the coronary oxygen supply increase.

The tests were carried out using 32 alert unanesthetized dogs, each weighing between 12 and 16 kg. and following the procedure of Rayford, Nuvos and Gregg, Proc. Soc. Exp. Biol. Med. 113, 876 (1963). Catheters were implanted surgically into the Sinus coronarius, the aorta and the vena cava of the animals whereby it was made possible to photometrically determine the coronary arteriovenous saturation difference (Brinkman, Arch. Chir. Neerl. 1, 177 (1949)) and from the actual hemoglobin values obtained to convert the values into the corresponding volume percents. The compounds were administered intravenously in the amounts indicated in 1 ml. of a 5% Lutrol-9-solution (liquid polyethylene oxide, molecular weight about 400, BASF-Ludwigshafen) in 5.5 percent aqueous glucose.

The compounds employed in the tests are set out in Table I, below, in which the results of the tests are also set forth in terms of the decrease in coronary $O_2$ depletion induced by the test compounds.

From Table I, it can be seen that the novel compounds of this invention exhibit marked coronary dilating properties, superior to those of the known Compound A, i.e., N(6)-benzyl-adenosine.

TABLE I

| Compound number | Compound name | Dosage, mg./kg., i.v. | Decrease of the coronary $O_2$ depletion [1] |
|---|---|---|---|
| A | N(6)-benzyl-adenosine | 0.4 | 2.5 |
| 1 | N(6)-(4-hydrazinocarbonyl-phenethyl)-adensoine | 0.2 | 8.4 |
| 2 | N(6)-(4-hydrazinocarbonyl-phenethyl)-2-chlor-adenosine | 0.2 | [2] 1.4 |
| 3 | N(6)-(4-hydrazinocarbonyl-benzyl)-adenosine | 0.2 | 8.2 |
| 4 | 1-[4-(nebularinyl-(6)-aminomethyl)-benzoyl]-2-(4-chloro-benzoyl)-hydrazine | 0.2 | 7.2 |
| 5 | 1-[4-(nebularinyl-(6)-aminomethyl)-3-chloro-benzoyl]-2-(4-hydroxy-ethoxy-benzoyl)-hydrazine | 0.2 | 9.5 |
| 6 | N(6)-(5-hydrazinocarbonyl-2-methyl-benzyl)-adenosine | 0.4 | 2.6 |
| 7 | 1-[4-(nebularinyl-(6)-aminomethyl)-benzoyl]-2-(4-methoxybenzoyl)-hydrazine | 0.2 | 8.4 |
| 8 | 1-[4-(nebularinyl-(6)-aminomethyl)-benzoyl]-2-(2-methylbenzoyl)-hydrazine | 0.2 | 8.8 |
| 9 | N(6)-(2-hydrazinocarbonyl-benzyl)-adenosine | 0.4 | 2.9 |
| 10 | N(6)-2-(4-hydrazinocarbonyl-phenoxy)-ethyl]-adenosine | 0.2 | 4.5 |
| 11 | N(6)-(3-hydrazinocarbonyl-benzyl)-adenosine | 0.2 | 6.5 |
| 12 | N(6)-(3-hydrazinocarbonyl-2-methyl-benzyl)-adenosine | 0.2 | 5.8 |
| 13 | N(6)-(4-hydrazinocarbonyl-2-methJl-benzyl)-adenosine | 0.2 | 8.2 |
| 14 | 1-[4-(nebularinyl-(6)-aminomethyl)-benzoyl]-2-(4-hydroxy-ethoxy-benzoyl)-hydrazine | 0.2 | 8.6 |

[1] At maximum effect in volume percent as compared to the starting values.
[2] Blood pressure depressing.

The compounds of this invention may be administered, to induce their circulatory action, in dosages of from 0.001 to 5.0 milligrams per kilogram of body weight. Suitably, treatment may be carried out from 1 to 4 times a day using a dose of from 0.05 to 5.0 in each application. For the serum lipid depressing effect, dosages of from 0.01 to 20.0 milligrams per kilo are suitable and these dosages may be administered in 1 to 4 administrations daily.

It will be understood that the specification and examples are illustrative but not limitative of the present invention and that other embodiments within the spirit and scope of the invention will suggest themselves to those skilled in the art.

What is claimed is:

1. Adenosine compound of the formula:

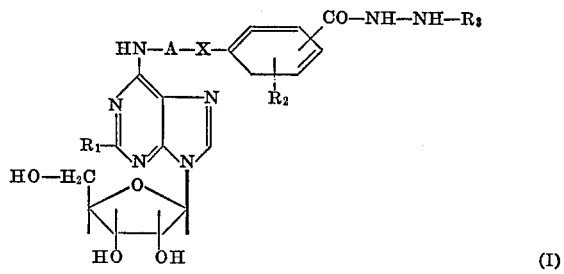

(I)

wherein $R_1$ is hydrogen or halogen; $R_2$ is hydrogen, halogen, hydroxyl, alkyl or alkoxy of up to 6 carbon atoms; $R_3$ is hydrogen or —CO—$R_4$, wherein $R_4$ is phenyl which is optionally substituted by halogen, alkyl, alkoxy, or hydroxyalkylenoxy, wherein the alkyl or alkoxy moieties contain up to 6 carbon atoms; A is a straight-chained or branched alkylene radical containing up to 3 carbon atoms and X is a valency bond or oxygen;

and the physiologically compatible salts thereof.

2. Compound as claimed in claim 1 wherein $R_2$ in the formula is hydrogen, chlorine or hydroxyl.

3. Compound as claimed in claim 1 wherein $R_2$ in the formula is alkyl or alkoxy of from one to six carbon atoms.

4. Compound as claimed in claim 1 wherein $R_3$ in the formula is hydrogen.

5. Compound as claimed in claim 1 wherein $R_3$ in the formula is —CO—$R_4$, wherein $R_4$ is phenyl.

6. Compound as claimed in claim 1 wherein $R_3$ in the formula is —CO—$R_4$ wherein $R_4$ is phenyl substituted one or more times with chloro, alkyl, alkoxy or hydroxyalkylenoxy wherein the carbon-containing substituents contain from one to six carbon atoms.

7. Compound as claimed in claim 1 wherein X in the formula is a valency bond.

8. Compound as claimed in claim 1 wherein X in the formula is oxygen.

9. Compound as claimed in claim 1 designated N(6)-(4-hydrazinocarbonyl-phenethyl)-adenosine.

10. Compound as claimed in claim 1 designated 1-[4-(nebularinyl-(6)-aminomethyl) - 3 - chloro-benzoyl] - 2-(4-hydroxyethoxybenzoyl)-hydrazine.

11. Compound as claimed in claim 1 designated 1-[4-(nebularinyl-(6)-aminomethyl)-benzoyl]-2-(4 - methoxybenzoyl)-hydrazine.

12. Compound as claimed in claim 1 designated 1-[4-(nebularinyl)-(6)-aminomethyl)-benzoyl]-2-(2 - methylbenzoyl)-hydrazine.

13. Compound as claimed in claim 1 designated 1-[4-(nebularinyl-(6)-aminomethyl)-benzoyl]-2-(4 - hydroxyethoxybenzoyl)-hydrazine.

References Cited
UNITED STATES PATENTS

| | | | |
|---|---|---|---|
| 3,502,640 | 3/1970 | Thiel et al. | 260—211.5 R |
| 3,551,409 | 12/1970 | Kampe et al. | 260—211.5 R |
| 3,590,029 | 6/1971 | Koch et al. | 260—211.5 R |

JOHNNIE R. BROWN, Primary Examiner

U.S. Cl. X.R.

424—180

UNITED STATES PATENT OFFICE
CERTIFICATE OF CORRECTION

Patent No. 3,787,391      Dated January 22, 1974

Inventor(s) Werner Jahn et al.

It is certified that error appears in the above-identified patent and that said Letters Patent are hereby corrected as shown below:

Column 2, line 16 (Formula III) "$CO-NH-NH-R_2$" should read -- $CO-NH-NH-R_3$ --. line 46 (Formula V) "$R_5$" should read -- $R_2$ --, Column 5, line 17, "ssytem" should read -- system --; Column 5, (Table I) Compound 10, should read -- N(6)-[2-(4-hydrazinocarbonylphenoxy)-ethyl]-adenosine --; Column 5 (Table I) Compound 13 should read -- N(6)-(4-Hydrazinocarbonyl-2-methyl-benzyl)-adenosine. --.

Signed and sealed this 24th day of September 1974.

(SEAL)
Attest:

McCOY M. GIBSON JR.
Attesting Officer

C. MARSHALL DANN
Commissioner of Patents